(12) United States Patent
Horibata

(10) Patent No.: US 7,748,865 B2
(45) Date of Patent: Jul. 6, 2010

(54) TRIANGULAR RED LED WARNING DEVICE

(76) Inventor: Hiroshi Horibata, Mitaka House, No. 25-20, Kamirejaku 5-Chome, Mitaka-Shi, Tokyo 181-0012 (JP)

( * ) Notice: Subject to any disclaimer, the term of this patent is extended or adjusted under 35 U.S.C. 154(b) by 618 days.

(21) Appl. No.: 11/581,513

(22) Filed: Oct. 16, 2006

(65) Prior Publication Data

US 2007/0091605 A1    Apr. 26, 2007

(30) Foreign Application Priority Data

Oct. 20, 2005    (JP)    ............... 2005-009691 U

(51) Int. Cl.
*F21V 21/00*    (2006.01)
(52) U.S. Cl. ............ 362/230; 362/249.03; 362/800; 362/249.02; 362/249.06; 362/249.09; 362/419; 362/449
(58) Field of Classification Search ............ 362/249, 362/252, 800, 249.03, 249.02, 249.06, 249.09, 362/419, 449
See application file for complete search history.

(56) References Cited

U.S. PATENT DOCUMENTS

| | | | | |
|---|---|---|---|---|
| 6,161,941 A | * | 12/2000 | Tait et al. | 362/249 |
| 6,932,495 B2 | * | 8/2005 | Sloan et al. | 362/294 |
| 7,001,044 B2 | * | 2/2006 | Leen | 362/223 |
| 7,080,930 B2 | * | 7/2006 | Pederson | 362/545 |
| 7,158,020 B2 | * | 1/2007 | Grady, Jr. | 340/473 |
| 7,217,004 B2 | * | 5/2007 | Park et al. | 362/240 |

FOREIGN PATENT DOCUMENTS

| | | |
|---|---|---|
| JP | UM 3055441 | 10/1998 |
| JP | 2002-309523 A | 10/2002 |

* cited by examiner

*Primary Examiner*—Anabel M Ton

(57) ABSTRACT

A triangular red LED warning device comprises a compact box. A pair of oblique side red LED flashing boards, a base side red LED flashing board and a pair of supporting leg plates. The pair of oblique side red LED flashing boards are connected frictionally by a frictional tightening means at each one end to both ends of the base side red LED flashing board, and their each other ends are also connected detachably by means of an elastic connecting pin at neighborhood of the vertical angle, which is formed by the both oblique side boards. Thus, the triangular red LED flashing board can make various signal forms by frictional rotation and stoppage of the each oblique side board for a suitable degree against gravity, and can be freely folded to be received into a compact box after using.

19 Claims, 4 Drawing Sheets

TRIANGULAR RED LED WARNING DEVICE

CROSS-REFERENCE TO RELATED APPLICATIONS

This application claims the benefit of a priority under 35 USC 119(a)-(d) to Japanese Utility Model Application No. 2005-9691 filed Oct. 20, 2005 the entire contents of which are hereby incorporated by reference.

FIELD OF THE INVENTION

This invention relates to a traffic warning light especially a triangular red LED warning device which can change its signal form and can be used conveniently for the warning equipment for traffic control, traffic accident, or road repair.

BACKGROUND OF THE INVENTION

Customary, the passenger cars, private cars, etc., are imposed legally a duty to carry always a red reflective triangular warning board and to use it upon the car accident, in order to prevent the secondary accident at that spot by the other passenger cars. However, discernment or check of the accident car was actually very difficult under bad weather conditions such as rainy weather and thick fog, and even when the weather condition is very fine, a same danger which may lead a secondary accident, is in the powerful headlight of an oncoming car, because the red reflective light from the warning board at the accident spot is negated.

By the reason, various triangular red LED warning boards provided the red high luminous LED, have been proposed to display certainly the accident spot or situation of an accident vehicle at night, and recently it has been further improved to a new triangular red LED warning device, which can be not only folded easily to receive into a box and carry easily here to there, even in a very narrow passenger car, but also to change variously its signal, as disclosed in Japanese Utility Model Registration No. 3,055,441 and Unexamined Patent Publication No. 2002-309523.

U.M. Registration No. 3,055,441 discloses an embodiment of such triangular red LED warning device providing a receiving box, which is fixedly combined with both ends of a base luminous portion of the device, on its both inside receiving plates. The device fixed with the box comprises also such base luminous portion equipped inwardly suitable numbers of the red LED bulbs, a first side luminous portion equipped inwardly same numbers of the same LED bulb and connected rotationally with one end of the base luminous portion at its one end, and a second side luminous portion equipped also inwardly same numbers of same LED bulb, and connected rotationally with an other end of the first luminous portion at it's ones end and its other end, with an other end of the base luminous portion, respectively.

The first and second side luminous portions form a triangular signal on the box by linking rotationally their each one end with the both ends of base luminous portion and by linking their each another end respectively, and connecting fixedly the both ends of the base luminous portion on the receiving plates of the box so that a top of the both make a desired vertical angle.

According to a leaflet of this triangular LED warning device, it is further emphasized that the device can emit a flashing LED signal such as in a shape of L character, formed by frictional fixing of their connecting portions, and a magnet is also attached in the bottom of the receiving box to adhere the device on the body of a car, so that an accident car can be easily checked from a distance place.

It is needless to say that the triangular red warning device in this embodiment, can be easily composed on or decomposed into the receiving box because the device and box are made in a body, however, it seems to be impossible to make various different LED signals from those signal boards by fixing frictionally one luminous side board on its other side board at each connection between the three side boards of the device, without using of a special setting screw or a frictional holding means, even if the board may form an other character signal temporally. The device is impossible to dispatch any other type of luminous signals except for the triangular signal, accordingly.

In the other side, the technology of Japanese Unexamined Patent Application No. 2002-309523 relates to such triangular red LED warning device that it's both oblique sides is rotationally to 180 degrees about an axis of a tightening screw penetrated into a common through hole of their one end and one of both ends of the base side of the device, if the screw is loosened, and enables to form various LED signals to emit them toward the coming car, after setting the each oblique sides to the side at desired angle respectively by tightening them with the loosened screw.

Thus, such special forms of the red LED warning signal firstly can prevent and decrease remarkably various accidents because the coming car and passer by is called their attention, due to its unique signal forms.

While, its each oblique luminous portion can also be folded before and behind a fixed base plate of the base luminous portion so that the three portions make a compact lamination to be received in a separated compact box, without any disconnection of the lead lines connected with each circuit board, and the red LED warning device folded in the compact box can be freely loaded always in a desired place even if there is any narrow space of the car.

The folding or setting up operation for the triangular red LED device are just same as a well known triangular warning plate or board, and is very simple to do it, however, it is somewhat inconveniently because the tightening means attached in a common through hole of the both ends of the base side board, for fixing the both oblique side boards to the former, has to be controlled every time, by a tightening means such as a screw bolt with the thumb and an index figure to fix the both at desired degree within 180 degrees, and consequently its firm tightening for setting up the later at desired angle to the former, is very difficult, and the set up former was frequently fallen down by gravity itself and the electric connections in the device were some time broken down.

BRIEF DESCRIPTION OF THE PRESENT INVENTION

An embodiment of the invention is a triangular red LED warning device that comprises mainly a paper or plastic box and a regular triangular red LED flashing board, which can be easily set up a triangular form for using and folded for receiving into the box. The device may be put always in a narrow space such as a trunk of a passenger car or a seat box of a small truck or a corner of loading platform of the same, as a legal standing accessory, accordingly. The device may also be used for a signal or warning light for traffic control, especially for traffic accident such as car accident, road works, guidepost, etc., for the passers or the traffic facilities on the road, as usual.

The triangular red LED flashing board comprises, in details, two red oblique side boards and a red base side board provided respectively a LED circuit board between a plastic boxy base plate and a plastic red refractive cover, and also two leg plates of which one of them is fixed with the bottom of the base side board and the other, rotationally to the one of leg plates by a center pin hereunder, with or without a lead weight, to support safely and perpendicularly the triangular red LED flashing board, in a crossed posture.

The both oblique side red LED flashing boards and the base side red LED flashing board of the triangular warning device is respectively connected such that each one end of the former is detachably connected by an elastic divided pin through a common connecting hole, and the other ends, fixedly and rotationally about each connecting pin through their connecting holes to the both ends of the later, by frictional contact surfaces between those ends, so that the boards can form expeditionary various red LED signals including the triangle, as described hereunder.

A typical circuit for the triangular red LED flashing board may comprise principally three sets of red LED circuits connected in series to a transistor switching circuit and an electric power source circuit.

The switching circuit of the flashing board comprises multiple transistors, resistances and condensers to regulate a flash interval of the red LED per minute and may be connected in series with only one of the three sets of the LED circuit, for simple assembly and low cost of the board, however, the switching circuit may also be connected to each LED set respectively to make a flashing flow of the each LED set or each LED bulb by regulating in order a transistor switching interval per one LED set or one LED bulb, as usual.

An embodiment of the present invention provides a triangular red LED warning device, which can be received conveniently in a suitable box and provided always at a narrow space of the passenger car, a small truck, etc., such as a trunk or a box under a driver or passenger seat.

An embodiment of the present invention to provides a triangular red LED warning device, which can be folded to receive in the box by releasing elastically a connection of both oblique side red LED flashing boards.

An embodiment of the present invention provides a triangular red LED warning device, which can form easily various luminous or flashing signals such as character signals, geometrical signals, traffic signals, etc., to awaken attention of the traffics or the passengers to prevent an accident at night.

An embodiment of the present invention provides a triangular Red LED warning device, which can be waterproofed easily with a thin plastic cover.

An embodiment of the present invention provides a triangular red LED warning device, which provides an economical switching circuit to reduce electrical and manufacturing cost.

An embodiment of the present invention provides a triangular red LED warning device, which can make a flashing light flow from one of the red LED flashing board to the others, in order, repeatedly.

An embodiment of the present invention provides a triangular red LED warning device, which can be charged electrically from car battery or solar panel on the device.

An embodiment of the present invention provides a triangular red LED warning device, whose location can be confirmed by an IT tab.

DETAILED DESCRIPTION OF EMBODIMENTS OF THE INVENTION

Figure 1:
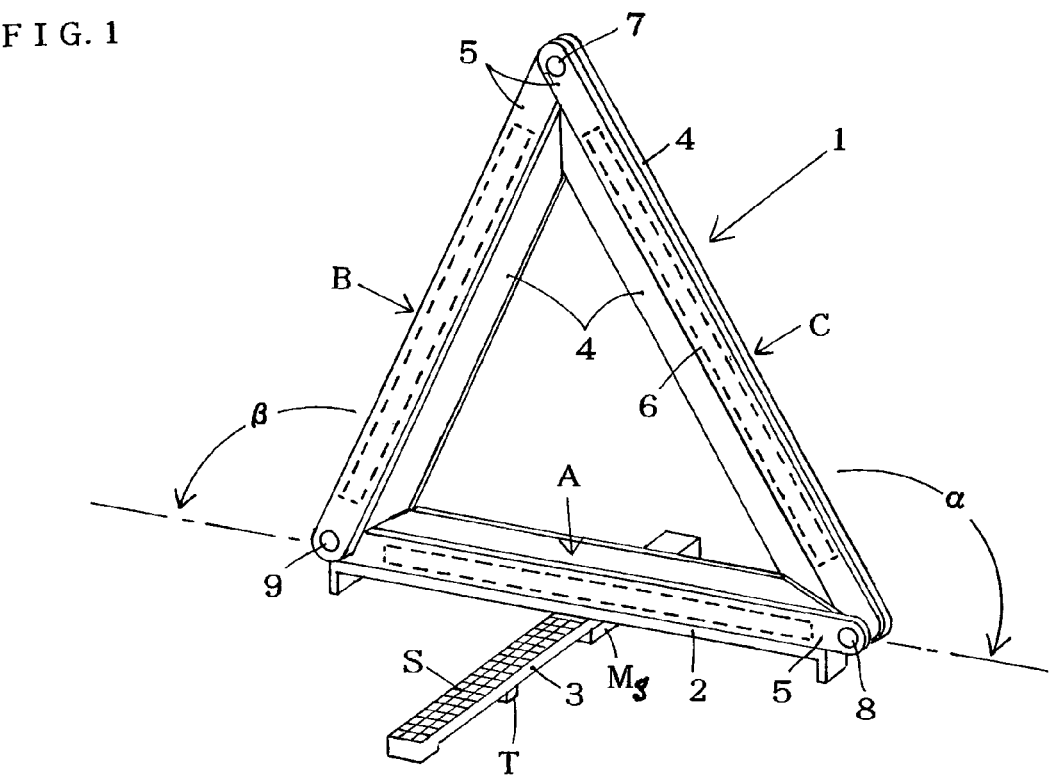
FIG. 1 shows a front perspective view for a triangular red LED warning device, according to an embodiment of the present invention.
Figure 2:
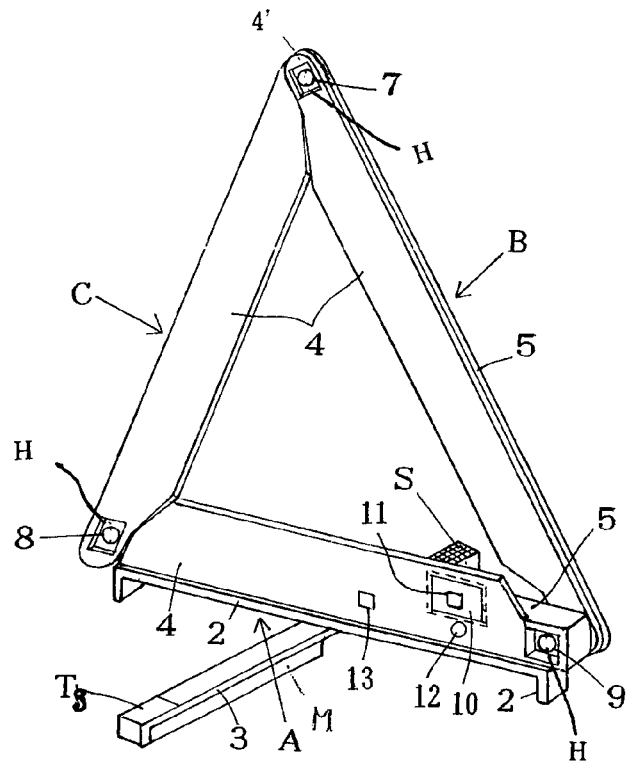
FIG. 2 shows also a rear perspective view for the triangular red LED warning device in FIG. 1.

Referring now to drawings and particularly FIGS. 1 and 2, a triangular red LED flashing board warning device 1 comprises a base side red LED flashing board A fixed on a pair of supporting plates 2, 3 providing two legs at its both and two oblique side red LED flashing boards, and can be changed freely into various flashing signals.

The each oblique side board B and C comprises a plastic base plate 4 providing a fin 4' for reinforcement of reflected red LED light and a rectangular hollow portion receiving a red LED circuit board 6 respectively, and a red refractive cover 5, and the both are connected detachably by the connecting means 7 as described hereunder, at neighborhood of their apex.

The base side board A comprises a plastic base plate 4 and a red reflective cover 5, as same as the oblique side board B, C, but it is made rather thicker than the oblique side board, due to receiving the red LED circuit board 6, and an electric power source 11 and so on.

The base side board A is connected with the each oblique side board B, C so that the later is frictionally fixed to the former through a pair of super hard metal washers 29, which has a raw surface respectively and piled between the both boards, in a relation of a raw surface to raw surface contact, but can rotate to the former by adding a small force which can overcome the frictional fix between the former and later, as described below.

The base board A, in the other side, provides there-under a pair of piled leg plates 2, 3 of which the upper leg plate 2 is fixed to the base board A directly and the lower plate 3 is also attached rotationally to the base board A by a central connecting pin through a spacer and the upper leg plate 2 so that the lower plate 3 can freely rotate with the connecting pin in a through hole between the both legs of the upper plate 2, as the usual manner.

The lower leg plate 3 may also provide a suitable weight or a magnet M between the both legs, and a solar panel S on its upper surface, to hold exactly a vertical attitude of the triangular red LED warning device 1 and to charge the electric power source during daylight hours.

Figure 3:
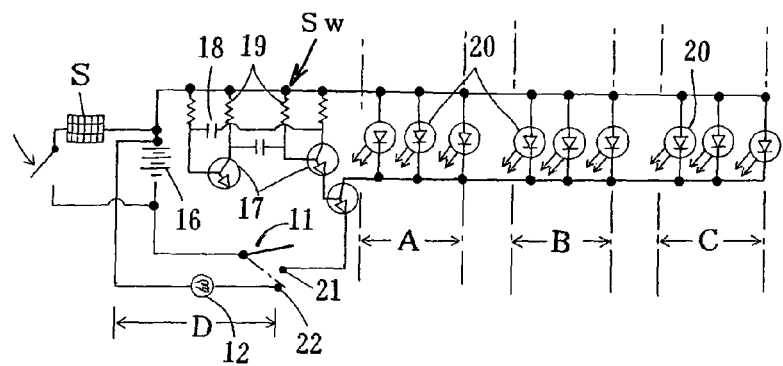
FIG. 3 shows an electric circuit of the present triangular red LED warning device.

The base side board A further provides inwardly a LED circuit board 6, as the both oblique side boards C, B, a pair of cell 16 in a cell box 10, a switch means 11, and a white LED bulb 12 and a charging terminal 13, and the all means or parts is respectively connected electrically through lead lines and a transistor switching circuit to emit the flashing light, as shown in FIGS. 2 and 3.

The connection of the oblique side boards is made elastically by insertion of a connecting pin 7, comprising a flat head 23, a long neck 24, a shoulder 25, a tapered trunk 26 and a divided slit 28. In the connecting operation, the pin 7 firstly is inserted into a hole at neighborhood of one end of the upper oblique side board C and hold loosely on the long neck 24 between the flat head 23 and the shoulder 25, so that it does not separate always from the upper oblique side board C and can be easily pressed into elastically a common hole of the lower oblique side boards B.

The flat head 23 of the pin 7 is secondary pressed with the upper oblique side board C by a thumb, and a hollow fin portion H of the lower oblique side board B by an other figure, as shown by arrows F and F', to hold elastically the hollow portion H of the later board B together with the former board C, between the head 23 and the shoulder 25 of the pin 7, as shown by H', after pressed up along a slope 26 of the trunk 27.

Contrary, the connection of the both oblique side boards B and C is also released, by pressing the end of trunk 27 toward the arrows f, f' with the thumb and the index figure to shrink the shoulder, and by pulling apart the hollow portion H' of the piled lower oblique side board B' from the upper oblique side board C for a reversed direction of the arrow F', after the shrunk shoulder 25 pushed into the hole of the piled boards C and B.

Figure 6:
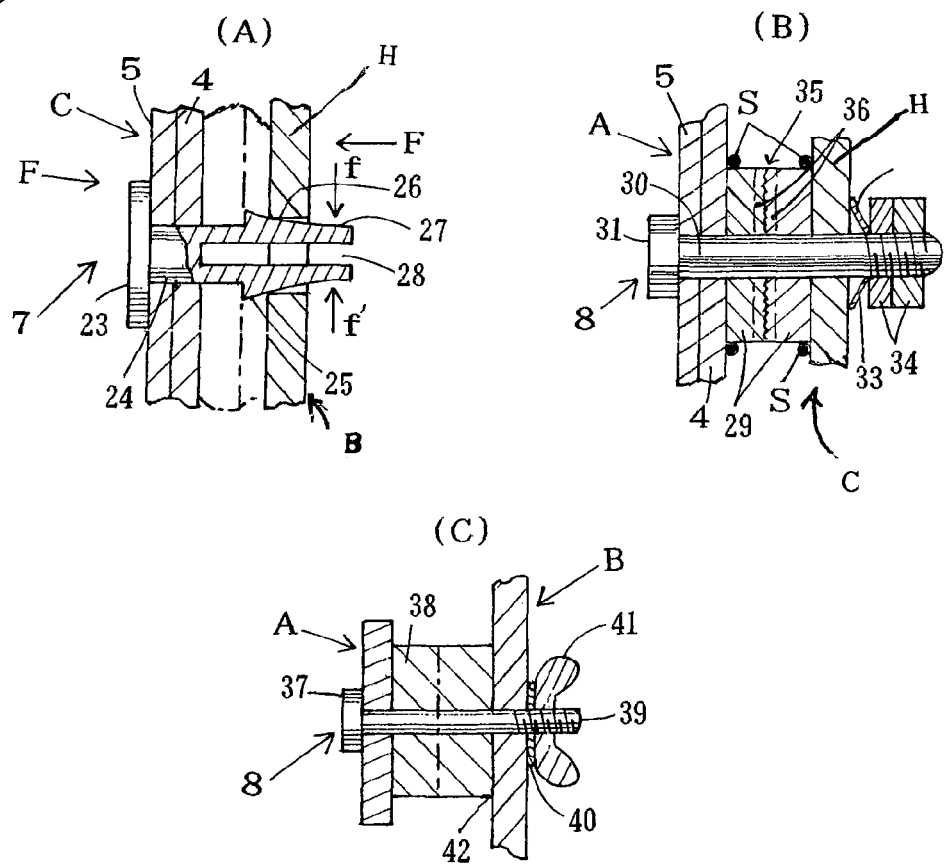
FIG. 6A shows a sectional view of an elastic connecting means for linking detachably each one end of the both oblique side red LED flashing boards.
FIG. 6B shows a sectional view of a frictional connecting means for linking each other end of the both oblique side red LED flashing boards and each end of the base side red LED flashing board.
FIG. 6C shows a sectional view for another embodiment of the frictional connecting means in FIG. 6B.

While, a preferable connection of the base side board A and the oblique side board B or C adjacent both ends of the former, can be made also by tightening strongly a piled both boards A, B or A, C and a pair of frictional super hard metal plates 29 there-between, through their common hole, by a special connecting means 8 or 9 which comprises a flat head bolt 31, double nuts 34 and a dish like spring washer 33, as shown in FIG. 6B.

The super hard plates 29, such as stainless steel, nickel titan, ceramics, special hard plastics, etc., provides a raw surface at one side respectively, and may be used as a pair of frictional washers, which are piled in a form of a raw surface to raw surface relation to make a frictional contact 35, between the base side board A and the oblique side board B, to prevent downward revolution of the later B, as shown by arrow B' in FIG. 5, by gravity, after the disconnection of the both oblique side boards B and C.

The frictional pair of washers 29 may use additionally a pair of elastic sheets 36 such as rubber, leather, cloth, etc., to prevent wear and tear of the hard raw surfaces by repeated operation of the oblique side board C also, and may be fixed respectively to the base plate 4 of the base side board A and the hollow fin portion H of the oblique side board C to prevent the downward revolution of the later board C by gravity, as the above connecting means.

In operation of the tightening of the both board A and C or B, a trunk 30 of the connecting means 8 or 9 firstly is inserted into a common hole of the both boards A, C and the frictional washers 29, and then screwed into strongly its screw portion 32 into double nuts 34, through a dish like spring washer 33, so that the each oblique side board C or B, after released from their connection, does not turn freely about the trunk 30, so far as an additional force is added on each board respectively.

FIG. 6C shows also a rather simple embodiment of the present connection provided a conventional tightening nut, and the means comprises a flat head bolt 37, a spring washer 40, a butterfly nut 41 and a pair of frictional washers 38 fixed at 42, as shown by black spots S in FIG. 6B to the both boards A and C.

The connecting means is rather cheaper and conventionally than the above embodiment, however it has some faults that the friction between the both frictional washers 38 is relatively weak to prevent downward revolution of the oblique side board by gravity and the nut 41 has to exchange frequently for its degeneration, due to repeatedly tightening.

Figure 7:
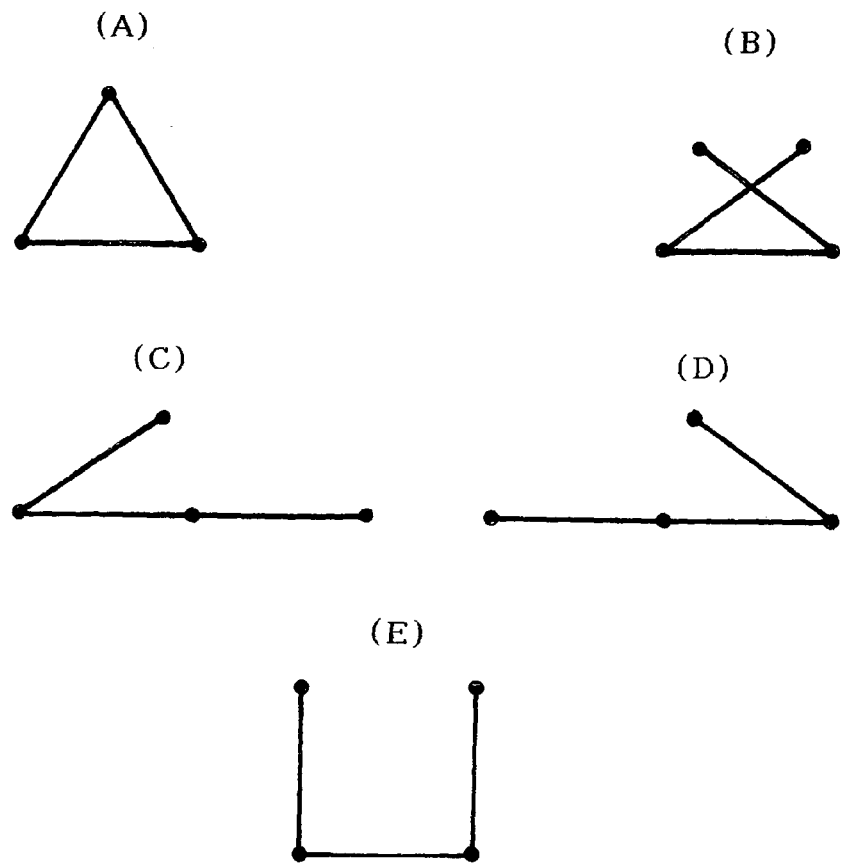
FIGS. 7(A)-(E) show various red light signal shapes emitted from the triangular red LED warning device wherein the shapes are formed from three folding side boards.

Thus, the present triangular red LED flashing board 1 can create various warning signal shapes from a set of folded three boards in a box. For example, the triangular signal A is firstly formed by connecting the each oblique side LED board in the common holes to from a vertical angle; secondly, a X shaped signal, by crossing the each oblique side board, after releasing those connections, and frictionally fixing at a suitable angles the both boards; thirdly, an arrow shaped signal directed to left or right side, by pulling down to horizontal either the oblique side board of the secondary signal for left or right direction, without movement of the other board; and finally, a block shaped signal, by standing up frictionally the both oblique side board respectively, as shown in FIG. 7 A-E.

Figure 4:
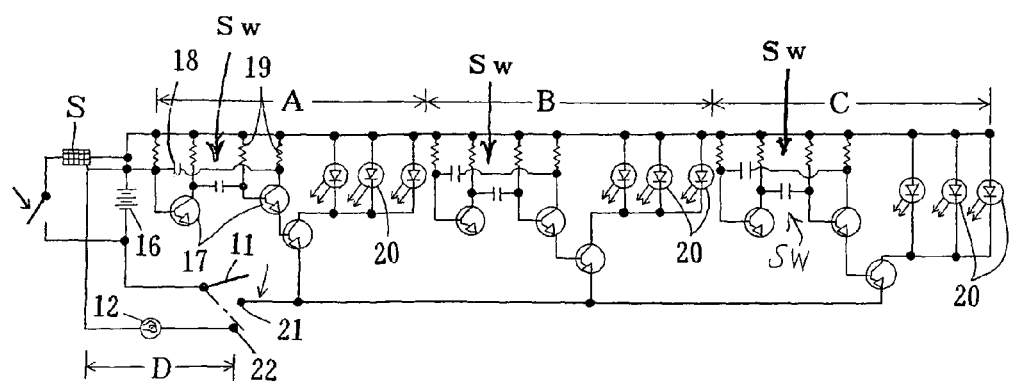
FIG. 4 shows another electric circuit of the present triangular red LED warning device.
Figure 8:
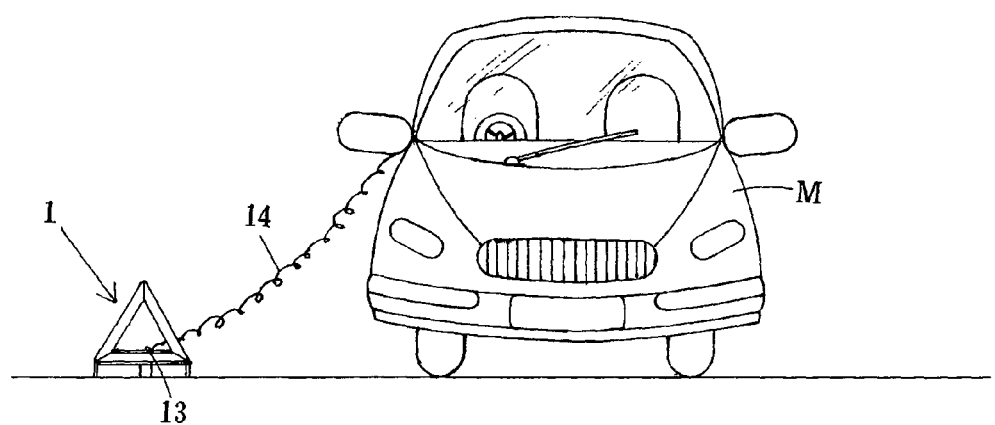
FIG. 8 shows electric charging or discharging of the present triangular red LED warning device from a car battery.

The present triangular red LED flashing board 1 provides further more a solar panel S and an IC tab Tg on an each half portion of an upper surface of the lower leg plate 3, a magnet or lead weight Mg there-under and a terminal T for connection of the solar panel S and cells 16 in the box 10 through their electrical terminal 13 for charging electric power in broad day light, as shown FIGS. 2 to 4. The terminal 13 is also used for charging the cells 16 from a battery of a passenger car M, as shown in FIG. 8 through a lead line 14 and a connecter 15 and from the solar panel S, as mentioned before. The IC tag Tg and the magnet Mg is also used respectively for an Internet information through artificial satellites or a computer to locate its installed location, and for equipment on a damaged car for warning the passengers or passenger car, etc.

Figure 5:
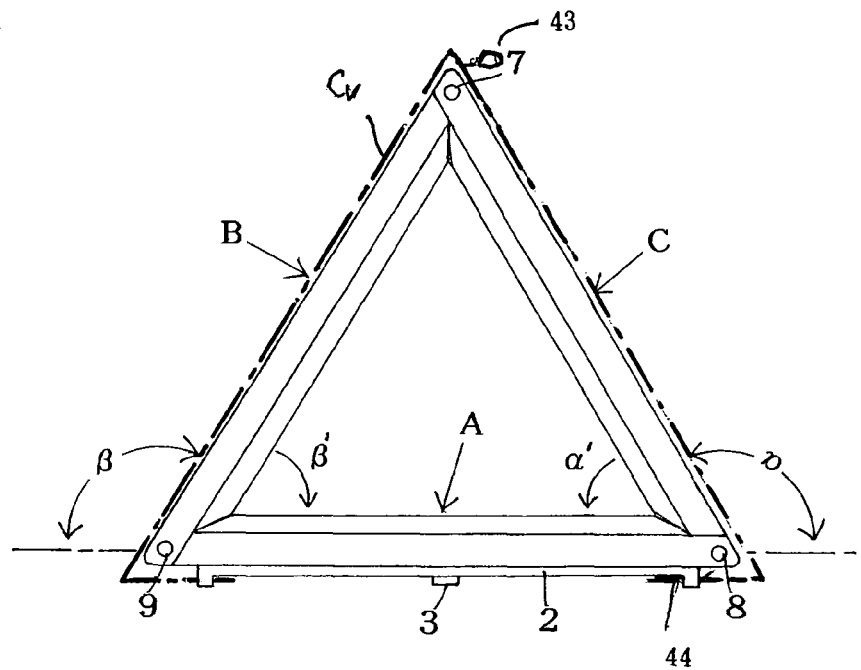
FIG. 5 shows a movable range of the both oblique side red LED flashing boards and a waterproof cover of the present LED warning device.

The triangular red LED flashing board 1 may be also waterproofed by a transparent triangular thin plastic cover Cv, as shown in FIG. 5. The cover provides a fastener 43 on an oblique side cover portion to close the device, and at least two holes on a bottom cover portion 44 for a pair of legs on the upper leg plate 2. Thus, the transparent triangular thin plastic cover Cv can protect almost portion of the warning device, except for the lower leg plate 3, from the rain water or moisture.

FIG. 3 shows a simple electric circuit for the present triangular red LED flashing bard comprises a cell circuit D, a transistor switching circuit Sw and triangular red LED flashing circuits A', B', C' connected through a switching piece 11 and a terminal 21, in series, respectively, and additionally a solar panel S and a white LED bulb 12 are also connected with the cell circuit D, in parallel. The switching circuit Sw comprises also three transistors 17, two condensers 18 and four resistances 19, and is connected with the cell circuit D and the red LED flashing circuit A', B', C' in series to regulate a switching interval per minute of the LEDs, as an usual manner. Thus, the all LEDs in the three red LED flashing boards can flash at same interval with one transistor switching circuit effectively.

FIG. 4 shows another circuit of the present triangular red LED flashing board comprises a cell circuit D, including cells 16, solar panel S and a white LED bulb 12 with a switching piece 11 and terminals 22, in parallel, and three side LED flashing circuits A', B', C' which provides respectively a transistor switching circuit Sw and a flashing LED circuit A', B' or C', as shown in FIG. 3. An IT tab which can inform a location of the triangular red LED warning device, through an artificial satellite or by an other suitable electro detector, may be also provided conveniently in a suitable circuit or on a suitable portion on the warning device.

The three circuits A', B', C' can be flashed also as a repeated light flow from the base side LED flashing circuit A' to the circuit C' by connecting a switching means (not shown) among the each circuit, to delay in order a light-on interval per each circuit or each LED, in a well known manner. Thus, the car drivers or the passengers can easily awake such unique continuous flow signal at the danger spot, and consequently secondary car accident can be prevented or decreased remarkably, on the highway, especially.

While, there has been described and pointed out the fundamental features of the present invention, as applied to disclosed embodiments, it will be understand that various omissions, substitutions and changes in the form and details of the triangular red LED warning device illustrated and its circuit or construction may be made by those skilled in the art, without departing from the spirit of the invention. The invention, therefore, is limited only as indicated by the scope of the following claims.

I claim:

1. A triangular red LED warning device comprising;
   a pair of red LED flashing oblique side boards;
   a red LED flashing base side board;
   a pair of supporting leg plates,
   each flashing oblique side board having disposed inwardly a respective LED circuit;
   the flashing base side board having a LED circuit with an electric power source circuit;
   the oblique side boards connected at a respective one end at a vertical angle;
   the base side board being frictionally connected at the both other ends of the oblique side boards;
   wherein the oblique side boards are fixed or released by respective means for connecting;
   wherein each oblique side board is frictionally rotated or fixed with or without a suitable force, about each axis of the means for connecting in a common connecting hole, between the oblique side boards and the base board; and
   each means for connecting for connection of the red LED flashing oblique side boards and the red LED flashing base side board comprises a flat head bolt, a pair of frictional washers providing a raw surface respectively, a dish like spring washer, and the raw surfaces of the both frictional washers are piled at a relation of a raw surface to raw surface contact, and firmly tightened by the means for connecting to create sufficient friction between the piled surfaces for prevention of the downward rotation of the oblique side board, by gravity.

2. The triangular red LED warning device of claim 1 wherein the pair of frictional washers are made from super hard metal or plastics and the like.

3. The triangular red LED warning device of claim 1 wherein the pair of washers holds a pair of elastic material such as rubber, plastics, leather and the like, between their raw surfaces; and the both elastic material provides respectively one raw surface also and is held between the both frictional washers in a relation of the raw surface to raw surface contact to prevent wear and tear of the raw surface of the frictional washers.

4. The triangular red LED warning device of claim 1 wherein the supporting leg plates comprise an upper leg plate and a lower leg plate; and
   a solar panel to charge the electric power source is provided on the lower supporting leg plate.

5. The triangular red LED warning device in claim 1 wherein the supporting leg plates comprise an upper leg plate and a lower leg plate; and
   a weight or magnet to maintain exactly a stand up attitude of the device, is provided under the lower supporting leg plate.

6. The triangular red LED warning device of claim 1 wherein an IC tag for remote sensing of the device, through an artificial satellite, is provided on an edge of one of the pair of supporting leg plates.

7. The triangular red LED warning device of claim 2 wherein the supporting leg plates comprise an upper leg plate and a lower leg plate; and
   a solar panel to charge the electric power source is provided on the lower supporting leg plate.

8. The triangular red LED warning device of claim 3 wherein the supporting leg plates comprise an upper leg plate and a lower leg plate; and
   a solar panel to charge the electric power source is provided on the lower supporting leg plate.

9. The triangular red LED warning device in claim 2 wherein the supporting leg plates comprise an upper leg plate and a lower leg plate; and
   a weight or magnet to maintain exactly a stand up attitude of the device, is provided under the lower supporting leg plate.

10. The triangular red LED warning device in claim 3 wherein the supporting leg plates comprise an upper leg plate and a lower leg plate; and
    a weight or magnet to maintain exactly a stand up attitude of the device, is provided under the lower supporting leg plate.

11. The triangular red LED warning device in claim 4 wherein the supporting leg plates comprise an upper leg plate and a lower leg plate; and
    a weight or magnet to maintain exactly a stand up attitude of the device, is provided under the lower supporting leg plate.

12. The triangular red LED warning device of claim 2 wherein an IC tag for remote sensing of the device, through an artificial satellite, is provided on an edge of one of the supporting leg plates.

13. The triangular red LED warning device of claim 3 wherein an IC tag for remote sensing of the device, through an artificial satellite, is provided on an edge of one of the supporting leg plates.

14. The triangular red LED warning device of claim 4 wherein an IC tag for remote sensing of the device, through an artificial satellite, is provided on an edge of one of the supporting leg plates.

15. The triangular red LED warning device of claim 5 wherein an IC tag for remote sensing of the device, through an artificial satellite, is provided on an edge of one of the supporting leg plates.

16. The triangular red LED warning device of claim 1 comprising a box for receiving the device.

17. The triangular red LED warning device of claim 1 wherein the means for connecting comprises a double nut for releasably tightening the bolt with the oblique side boards and the base side board.

18. The triangular red LED warning device of claim 1 wherein the means for connecting comprises a wing nut for releasably tightening the bolt with the oblique side boards and the base side board.

19. The triangular red LED warning device of claim 1 comprising a transparent triangular cover for protecting the device.

* * * * *